US009074844B2

(12) United States Patent
Essbaum (10) Patent No.: US 9,074,844 B2
(45) Date of Patent: Jul. 7, 2015

(54) ROCKET LAUNCH TOWER (71) Applicant: Alexander Dankwart Essbaum, Staefa (CH)

(72) Inventor: Alexander Dankwart Essbaum, Staefa (CH)

( * ) Notice: Subject to any disclaimer, the term of this patent is extended or adjusted under 35 U.S.C. 154(b) by 160 days.

(21) Appl. No.: 14/341,174

(22) Filed: Jul. 25, 2014

(65) Prior Publication Data

US 2015/0101479 A1 Apr. 16, 2015

Related U.S. Application Data (60) Provisional application No. 61/858,549, filed on Jul. 25, 2013, provisional application No. 61/869,322, filed on Aug. 23, 2013.

(51) Int. Cl.
| *F41F 3/00* | (2006.01) |
| *F41F 1/00* | (2006.01) |
| *F41F 3/073* | (2006.01) |
| *B64F 1/06* | (2006.01) |
| *F41F 3/04* | (2006.01) |

(52) U.S. Cl.
CPC . *F41F 3/073* (2013.01); *B64F 1/06* (2013.01); *F41F 3/04* (2013.01)

(58) Field of Classification Search
CPC ............ F41F 1/00; F41F 1/06; F41F 3/04; F41F 3/0406; F41F 3/073; F10F 3/00
USPC ............ 89/1.804, 1.815, 1.816, 1.819
See application file for complete search history.

(56) References Cited

U.S. PATENT DOCUMENTS

| 3,077,144 | A | * | 2/1963 | Barker, Jr. et al. ........... 89/1.819 |
| 3,081,626 | A | | 3/1963 | Shaller |
| 3,088,698 | A | * | 5/1963 | Ongaro ........................ 244/63 |
| 3,363,508 | A | * | 1/1968 | Stahmer ...................... 89/1.818 |
| 3,379,097 | A | * | 4/1968 | Fisher ......................... 89/1.816 |
| 3,789,729 | A | * | 2/1974 | Aupy ............................ 89/1.8 |
| 4,134,327 | A | * | 1/1979 | Piesik ............................ 89/1.8 |
| 6,330,866 | B1 | * | 12/2001 | Cipolla ........................ 114/238 |
| 6,354,182 | B1 | * | 3/2002 | Milanovich ................. 89/1.818 |
| 7,530,532 | B2 | * | 5/2009 | Watts ........................ 244/171.3 |
| 7,997,224 | B2 | * | 8/2011 | Owen et al. .................. 114/238 |
| 2006/0011055 | A1 | * | 1/2006 | Root ........................... 89/1.819 |
| 2009/0255398 | A1 | * | 10/2009 | Paul ............................ 89/1.819 |
| 2010/0269677 | A1 | * | 10/2010 | Patel et al. .................... 89/1.819 |
| 2010/0300274 | A1 | * | 12/2010 | Root, Jr. ...................... 89/1.814 |

* cited by examiner

*Primary Examiner* — Bret Hayes
*Assistant Examiner* — Derrick Morgan
(74) *Attorney, Agent, or Firm* — Richards Patent Law, P.C.

(57) ABSTRACT

A rocket launch tower is provided, including: a vertical support structure including two or more guide towers defining a vertical shaft between the two or more guide towers, each guide tower including one or more pulleys engaging one or more cables; a platform located within the vertical shaft and connected to the one or more cables; a drive mechanism that applies a force to the one or more cables to accelerate the platform along a trajectory within the vertical shaft; one or more sensors collecting data regarding the position of the platform along the trajectory within the vertical shaft and communicating the platform position data to a controller, the controller in communication with an acceleration control system including one or more brakes acting on the platform; wherein the controller causes the acceleration control system to actively correct the platform acceleration towards an intended platform acceleration.

13 Claims, 7 Drawing Sheets

ROCKET LAUNCH TOWER

CROSS-REFERENCE TO RELATED APPLICATIONS

This application claims priority to and the benefit of U.S. Provisional Application 61/858,549, filed Jul. 25, 2013 and to U.S. Provisional Application 61/869,322, filed Aug. 23, 2013 both of which are hereby incorporated by reference.

BACKGROUND OF THE INVENTION

The present subject matter relates generally to a rocket launch tower having pre-acceleration of the rocket before powered flight. More specifically, the present invention relates to a rocket launch tower that uses falling counterweights to accelerate and stabilize a platform supporting a rocket at a higher rate of speed than the speed of the counterweights.

Launching rockets into space is very energy intensive and inefficient. Modern launch vehicles are able to deliver between 1% (Space Shuttle) and at most 4% (Saturn V) of the total vehicle mass at launch into low earth orbit. This makes it extremely costly to deliver even a small payload to space (going rates are $5000-$10,000 per kilogram). A number of inventions have been proposed to provide ground-based power for helping to launch rockets but so far none have been implemented successfully.

One previously proposed solution involves using falling counterweights with a simple fixed pulley arrangement to accelerate a rocket upward (See, for example, U.S. Pat. Nos. 3,088,698 and 7,530,532). Using this solution, the greatest acceleration a falling object can achieve is 1 g. A counterweight using a simple fixed pulley that is lifting a load will always accelerate at less than 1 g. Therefore, a simple pulley lifting a rocket launch platform will accelerate a rocket at less that 1 g. As a traditional rocket already accelerates upward at around 0.5 g such a counterweight launch arrangement does not provide much benefit, or requires an extremely tall tower structure.

Another previously proposed solution involves recirculating exhaust gas from a rocket to push a launch platform upward (See, for example, U.S. Pat. Nos. 3,363,508 and 6,318,229). Containing recirculated exhaust gas requires either a chamber sealed to the engines of the rocket (which is technically complicated and prone to damage the engines due to backpressure) or an unsealed or partially sealed chamber that would provide inconsistent pressure and therefore inconsistent acceleration of the rocket.

A further previously proposed solution involves using electric motors to pull cables that accelerate a rocket upward (See, for example, U.S. Pat. No. 3,363,508). Electric motors to propel a rocket would be excessively large and require an excessive amount of energy at launch—this is technically difficult and expensive to achieve.

Yet another previously proposed solution involves using a compressed gas to rapidly inflate a chamber underneath a rocket, propelling it upwards (U.S. Pat. No. 6,354,182). Propelling a rocket using an expanding gas requires a sealed chamber under the rocket that remains sealed as the rocket accelerates upward. Such a large sealed chamber (like a giant gun barrel) is impractical and excessively expensive to manufacture for the size necessary, and the machinery necessary to smoothly but powerfully fill this giant cylindrical barrel would be excessively large, complex, and expensive.

An even further previously proposed solution involves stretching elastic material under a rocket and using it to propel a rocket upward (See, for example, U.S. Pat. No. 6,354,182). No such material exists that will contain sufficient energy over a sufficient range of motion to make an elastic launch system useful or practical.

Moreover, none of the existing rocket launch mechanisms provide the capacity to finely adjust and control the upward acceleration in the range appropriate and useful for a rocket. Too much acceleration (over about 5 g) will damage the rocket, and too little will not provide enough assistance to guarantee the rocket reaches orbit with its additional payload. It is important that the upward acceleration can be finely controlled in the useful range for a rocket.

Additionally, none of the existing rocket launch mechanisms guarantee that the rocket will be accelerated in a straight line, with no tilting or lateral movement (movement perpendicular to the centerline of the rocket). Rockets are relatively fragile in all directions excepting a steady push from below, and any system that does not provide for a smooth enough, straight vertical acceleration is prone to damage the rocket.

Finally, prior attempts failed to take into account the limited acceleration provided by a simple (non-multiplying) pulley arrangement, as well as the need to precisely control the acceleration as well as lateral and tilting movement of the launch platform. In the absence of these features, a gravity-powered launch tower would not be useful. As evidence, none was ever built.

What is needed are mechanisms to address the weaknesses in current launch technology and substantially improve the payload capacity of existing and future rockets for relatively low cost.

Accordingly, there is a need for a rocket launch tower including a pulley system that drives a platform that is dynamically stabilized, as described herein.

BRIEF SUMMARY OF THE INVENTION

To meet the needs described above and others, the present disclosure provides a rocket launch tower including a pulley system that drives a platform that is dynamically stabilized. By providing a rocket launch tower that includes a pulley system that drives a platform that is dynamically adjusted by an active stabilization subsystem including one or more stability mechanisms, the launch tower will provide a means for launching existing rockets with an initial upward velocity to allow a given rocket to carry a heavier payload into space. Additionally, by providing a rocket launch tower that includes a braking system and active stability system, the rocket launch tower may provide stable launch of the rocket while providing a mechanism to prevent loss of the rocket due to instability that may be caused by the pulley system.

In an embodiment, the rocket launch tower includes a platform that supports a rocket. In use, the rocket launch tower launches the rocket from the upward-moving platform thereby imparting energy into the rocket before or in conjunction with the rocket using its own propellant.

The platform may be connected to cables to provide the upward force during launch. The cables may, in turn, connect the platform to an arrangement of counterweights via a pulley system. During launch, the counterweights are allowed to fall, accelerating the cables to cause upward movement of the platform. A surrounding structure guides the platform and provides support to the cables via pulleys at the top of the surrounding structure that engage the cables. The surrounding structure may include one or more guide towers that may guide the platform during ascent.

The cables may be connected to the platform, may run up the inner walls of the shaft, and may engage an arrangement of pulleys at the top of the support structure. The cables may further continue down to a further arrangement of pulleys comprising a block-and-tackle. The counterweights may be suspended from the further arrangement of pulleys.

The pulleys may be arranged such that the falling counterweights accelerate the platform at a higher acceleration than that of the counterweights. In an embodiment, a block-and-tackle may connect the cables to the counterweights. A block-and-tackle may be provided as a subsystem of two or more blocks with the cable threaded between them. In one embodiment, each block may include a set of pulleys mounted on a single axle. In another embodiment, the blocks may be fiddle blocks. The mechanical advantage of the block-and-tackle may be constructed to provide acceleration in the useful range for a rocket (approximately 1 g to 5 g), and may be adjustable if future rockets can tolerate more than 5 g. The counterweights and pulley system may be sized to provide more than the maximum acceleration a rocket can tolerate, but in use the acceleration may be modulated using the braking system to limit the acceleration to the appropriate amount for a given rocket.

The platform may be large enough to accommodate a desired rocket. The platform may be adapted to support the weight of the rocket multiplied by the expected acceleration. For example, a 320,000 kg rocket that will be accelerated at 5 g must have a platform capable of supporting 1.6 million kilograms.

The surrounding structure may be embodied as two or more guide towers. In a pre-launch configuration, the guide towers may extend vertically from and surround the platform to define an interior shaft. The shaft may permit the platform to move freely vertically while constraining the horizontal movement of the platform.

It is contemplated that factors such as manufacturing defects, mechanical stress, temperature, wind, and other factors may create imperfections in the guide towers causing deviations of the guide towers from the straight-line vertical needed for a straight-line trajectory for the rocket. In an embodiment, the platform may be adapted to move laterally within the shaft to correct any deviations from the straight-line upward trajectory by pushing against an inner wall of one of the guide towers. In another embodiment, a movable base plate may be provided to correct deviations from the straight vertical path.

The rocket launch tower may include stability mechanisms for stabilizing the rocket to prevent loss of the rocket due to instability during launch. Stability mechanisms may include passive stability mechanisms and an active positioning subsystem. The stability mechanisms may include mechanisms to locate the platform horizontally within the surrounding structure.

In an embodiment, the inner wall of the guide towers may include guide rails. The platform may include guide wheels that engage with the guide rails to stabilize the platform during launch. The guide wheels may be connected to the platform body by springs to dampen deviations of the platform body caused by the motion of the guide wheels and imperfections in the guide towers.

The rocket launch tower may further include active stability mechanisms that control the lateral location of the platform. The platform may include platform linear actuators that may actuate to stabilize the platform body along the straight vertical path. The platform linear actuators may be controlled by the controller and may be actuated in response to imperfections measured by one or more sensors. In some embodiments, the platform includes a combination of passive stability mechanisms and active stability mechanisms.

The action of the active positioning subsystem acts to prevent deviations from a straight vertical path. It is understood that the guide rails of the guide towers may have various imperfections that may cause deviation of the platform from a straight vertical path as the platform moves along the guide rails. Imperfections may include local bending of the guide rails, leaning of the guide rails, etc. As the platform moves along the guide towers during launch, the active positioning system actuates platform linear actuators to keep the platform centered along the straight vertical path.

In some embodiments, the rocket launch tower may include functionality to permit the platform to be used to evaluate the straightness of the surrounding structure. Before launch, the platform may travel up the path of the platform and analyze the surrounding structure to measure imperfections in the surrounding structure, as may be present in the guide towers, the guide rails, etc. In order to measure imperfections, the platform may include various sensors to measure the imperfections. For example, in an embodiment, the platform may measure at various discrete points the needed amount of actuation required by the platform linear actuators to maintain the platform along the straight vertical path. The measured imperfections are recorded by the active positioning subsystem. During launch, the active positioning subsystem corrects for the imperfections dynamically as the platform moves up the surrounding structure. In other embodiments, an additional mechanism or system may be provided in addition to the platform to perform the evaluation of the straightness of the surrounding structure.

In some embodiments, the platform includes an attached base plate that may be passively or actively positioned relative to the platform. By providing a base plate, the stability mechanisms need not operate on the entire platform, but may specifically fine-tune the positioning of the rocket. Nevertheless, the platform may be passively positioned against the inner walls of the surrounding structure to provide additional stability.

For example, base plate linear actuators controlled by the controller may stabilize the base plate. In another embodiment, the platform may be stabilized by a passive stability mechanism. In the example shown, the platform is stabilized by springs. The base plate, however, may be stabilized by an active stability mechanism. In the example shown, the base plate is connected to the platform by base plate linear actuators.

In some embodiments, both passive and active stability mechanisms may be used in series. For example, the base plate is connected to the platform via springs that are in turn connected to base plate linear actuators. Similarly, the platform itself is connected to the guide wheels by springs, in addition to the springs connecting the base plate to the base plate linear actuators and, in turn, connecting the base plate to the platform.

In another embodiment, the stability mechanisms may include mechanisms to locate the base plate horizontally relative to the platform on which the base plate is supported. In embodiments with a base plate, the stability mechanisms may include hydraulic rams, linear actuators, levers, gear-driven mechanisms, etc. The stability mechanisms may also include passive mechanisms, which may be comprised of springs, torsion bars, or other such passive suspension elements.

In an embodiment, the stability mechanisms may include a braking system. The braking system serves to control the vertical speed of the platform and stop the platform after the rocket has left the platform. The braking system may include traditional brake calipers attached to the platform to brake the platform by applying friction to the guide rails or other, separate and parallel, braking rails. The active positioning subsystem may use the braking system to limit the acceleration applied to the rocket to levels appropriate for the rocket and its payload. In other embodiments, the braking system may be comprised of a braking calipers attached to the pulleys or to the cables.

In some embodiments, there may be an arrangement of adjustable support wires connected between the surrounding structure and the ground or other fixed object. The support wires may serve to keep the surrounding structure straight by applying tension to compensate for any bending or lack of straightness in the guide towers. The support wires may be connected to adjustable support wire motors to permit real-time adjustment. The support wire motors may be controlled by the controller to compensate for any lack of straightness in the towers including shifting and bending of the towers due to wind, thermal expansion, and other effects. The support wire motors may be linear actuators, electric motors, etc. Each support wire motor may be attached to a weighted block or structure embedded in or attached to the ground.

Adjustment using the support wires may proceed as follows: the controller detects any lack of straightness in the rocket launch tower using the sensors. For example, imagine that the rocket launch tower is found to be leaning to the left (e.g., the top of the rocket launch tower is too far to the left from the perspective of a viewer in front of the rocket launch tower). In this case, the right support wire motors would be adjusted to increase the tension on the right support wire, and the left support wire motors connected to the left support wire would be adjusted to decrease the tension on the left support wire, thereby pulling the tower back into a vertical position. Although the rocket launch tower is shown as having two support wires, in other embodiments, the rocket launch tower may include any number of support wires at varying positions around the rocket launch tower, and at varying heights up and down the rocket launch tower, as will be understood by one of ordinary skill in the art from the examples provided herein.

In an embodiment, the rocket launch tower may include an active positioning system for managing the rocket launch tower to stabilize the rocket during ascent. As shown, the active positioning system may include: the controller, one or more sensors, a main memory including instructions for stabilizing the rocket, and one or more active stability mechanisms, such as: platform linear actuators, base plate linear actuators, the braking system, and adjustable support wire motors. The sensors may include sensors that measure: the vertical acceleration of the platform, the vertical speed of the platform, the vertical position of the platform, the horizontal acceleration of the platform, the horizontal speed of the platform, the horizontal position of the platform, the tilt of the platform, the horizontal acceleration of the base plate, the horizontal speed of the base plate, the horizontal position of the base plate, the tilt of the base plate, the acceleration of the cables, the speed of the cables, the rotational acceleration of the pulleys, the rotational speed of the pulleys, etc.

The active positioning subsystem may be programmed to attempt to maintain certain movement of the platform. Typically this will involve a certain rate of acceleration depending on the capability of the rocket as well as maintaining ascent of the rocket on the straight vertical path. The active positioning subsystem may manage the rate of acceleration by modulating the braking system (for example, if the platform exceeds the requested acceleration it will apply braking, if the platform fails to reach the required acceleration it will reduce braking). Additionally, if the sensor and active positioning subsystem detects that the platform is beginning to tilt (for example, one side of the platform is moving upward more quickly than the other), the active positioning subsystem may apply additional braking on the too-high side, while reducing braking on the too-low side. Finally, the active positioning subsystem may adjust the active positioning system when it detects a lateral movement of the platform such that the platform or base plate moves in a straight vertical line.

In an embodiment, a rocket launch tower includes: a vertical support structure including two or more guide towers defining a vertical shaft between the two or more guide towers, each guide tower including one or more pulleys engaging one or more cables; a platform located within the vertical shaft and connected to the one or more cables; a drive mechanism that applies a force to the one or more cables to accelerate the platform along a trajectory within the vertical shaft; one or more sensors collecting data regarding the position of the platform along the trajectory within the vertical shaft and communicating the platform position data to a controller, the controller in communication with an acceleration control system including one or more brakes acting on the platform; wherein, the controller compares the platform position data received from the sensors to an intended platform acceleration and in response to receipt of platform position data indicating the platform acceleration has deviated from the intended platform acceleration, the controller causes the acceleration control system to actively correct the platform acceleration towards the intended platform acceleration.

In some embodiments, the drive mechanism includes one or more counterweights connected to the one or more cables by a block-and-tackle. Additionally, in some embodiments, the controller is also in communication with an active positioning system including the one or more brakes, further wherein, in response to receipt of platform position data indicating the platform trajectory has deviated from the intended platform trajectory, the controller causes the active positioning system to actively correct the platform trajectory towards the intended platform trajectory. Additionally, in some embodiments, the active positioning system further includes one or more linear actuators.

In some embodiments, each guide tower includes one or more guide rails, the platform includes two or more guide wheels, each of the guide wheels engages one of the one or more guide rails, and the active positioning system includes one or more linear actuators connecting the platform to the guide wheels.

In some embodiments, the rocket launch tower further includes a base plate, wherein the base plate includes one or more wheels, and the one or more wheels engage the platform. Additionally, in some embodiments, the base plate is connected to the platform by one or more linear actuators. Moreover, in some embodiments, a spring connects the linear actuator of the base plate to the platform.

In some embodiments, each guide tower includes one or more guide rails, the platform includes two or more guide wheels, each guide wheels engages one of the guide rails, each guide wheel is connected to the platform by a linear actuator, each linear actuator includes a sensor to measure the amount of actuation, wherein the controller is adapted to: receive from each sensor, during a pre-launch test, a plurality of measurements, taken at a plurality of points along the shaft, of the amount of actuation sufficient to maintain the platform trajectory along a straight vertical path; direct each actuator, during a launch, to actuate at each point along the shaft in accordance with the amount of actuation sufficient to maintain the platform trajectory along a straight vertical path.

In some embodiments, each guide tower includes one or more guide rails along the vertical shaft, the platform includes two or more guide wheels, and each guide wheels engages one of the one or more guide rails. Additionally, in some embodiments, each guide wheel is connected to the platform by a spring.

In some embodiments, the rocket launch tower further includes a base plate, wherein the base plate includes one or more wheels, each wheel engages the platform, and the base plate is laterally connected to the platform by one or more springs.

In some embodiments, each guide tower includes one or more guide rails along the shaft, the platform includes two or more guide wheels, the two or more guide wheels engage the one or more guide rails, the platform includes a base plate, and the base plate includes one or more wheels that engage the platform.

In some embodiments, the one or more brakes are connected to one of the vertical support structure or the platform, and the brakes, when activated by the controller, apply a braking force to one of: the one our more counterweights, the one or more cables, the one or more pulleys, and the platform.

In some embodiments, the one or more sensors include a straightness sensor attached to each guide tower detecting deviations of the guide tower from vertical straightness, the active positioning system further includes one or more support wires connected to the support structure, each of the support wires is connected to one or more tightening motors controlled by the controller, wherein the controller causes the one or more tightening motors to adjust the tension of the one or more support wires when the controller detects a deviation of one of the guide towers from vertical straightness.

An object of the invention is to provide a solution to find a cheap and reliable way to apply ground-based power to rocket launches.

Another object of the invention is to provide a solution to increase the payload capacity of existing rockets with a simple technological improvement over existing technology.

A further object of the invention is to reduce limitations on testing large rocket components. Rocket designers are currently limited in their ability to test large rocket components. The only way to subject the structure and components of a rocket to the loads imparted on it by launch and ascent is to launch the rocket. This is failure-prone (any major failure during flight results in destruction of the rocket) and rarely involves the ability to inspect the components after flight (most rockets, and certain components of all rockets) are non-recoverable (lost in space, destroyed in re-entry, damaged or destroyed on impact with the sea or the ground, etc.)

An advantage of the invention is that it provides a relatively inexpensive, reusable, and reliable way to increase the payload capacity of existing rockets.

A further advantage of the invention is that it provides a mechanism to reproduce the acceleration of a flying rocket in a non-destructive and repeatable fashion. The invention can simply subject a test article to the appropriate acceleration and then brake to a stop before the test article exits the top of the structure. The platform can then be lowered back to the ground and the test article inspected. This feature of the invention will improve rocket reliability through component testing and should allow rocket designers to produce more efficient rockets by removing the tendency to over-design a component that cannot otherwise be sufficiently tested. Rocket designers are currently limited in their ability to test large rocket components. The only way to subject the structure and components of a rocket to the loads imparted on it by launch and ascent is to launch the rocket. This is failure-prone (any major failure during flight results in destruction of the rocket) and rarely involves the ability to inspect the components after flight (most rockets, and certain components of all rockets) are non-recoverable (lost in space, destroyed in re-entry, damaged or destroyed on impact with the sea or the ground, etc.) This feature of the invention will improve rocket reliability through component testing and should allow rocket designers to produce more efficient rockets by removing the tendency to over-design a component that cannot otherwise be sufficiently tested.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
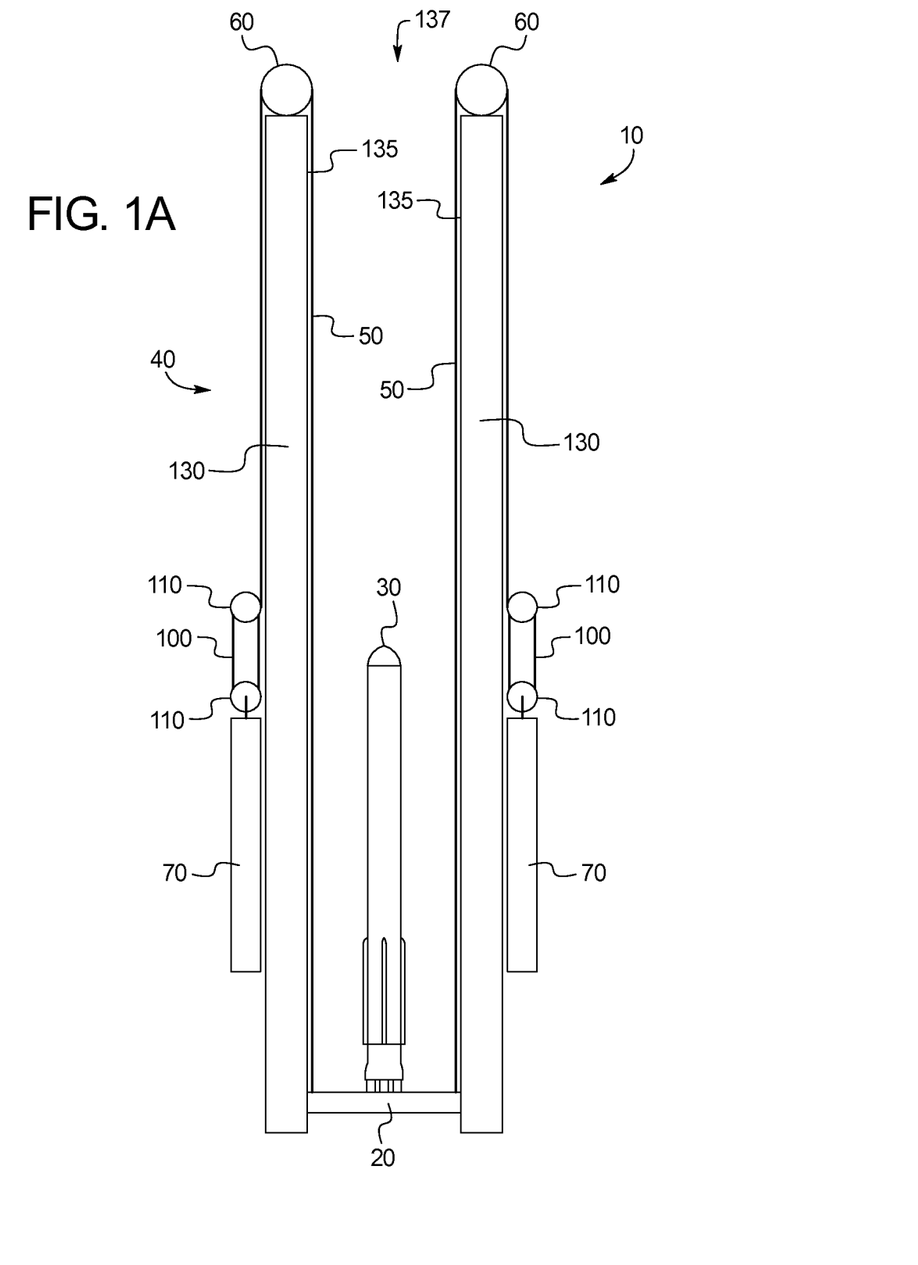
FIG. 1a is a front perspective view of an example rocket launch tower.
Figure 1B:
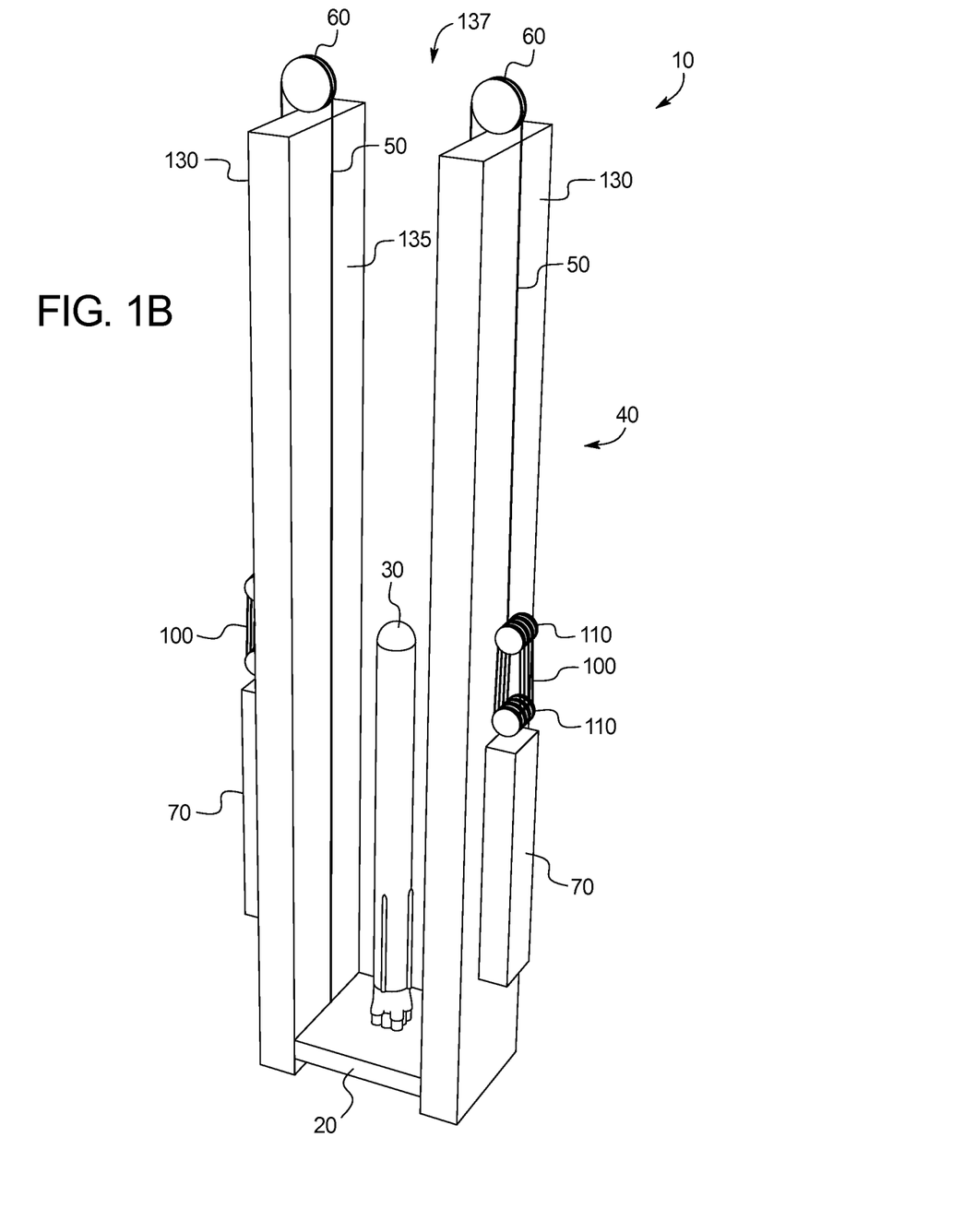
FIG. 1b is a perspective view of an example rocket launch tower.

FIGS. 1a and 1b illustrates an embodiment of a rocket launch tower 10. The rocket launch tower 10 includes a platform 20 that supports a rocket 30. In use, the rocket launch tower 10 launches the rocket 30 from the upward-moving platform 20 thereby imparting energy into the rocket 30 before or in conjunction with the rocket 30 using its own propellant.

The platform 20 may be connected to cables 50 to provide the upward force during launch. The cables 50 may, in turn, connect the platform 20 to an arrangement of counterweights 70 via a pulley system. During launch, the counterweights 70 are allowed to fall, accelerating the cables 50 to cause upward movement of the platform 20. A surrounding structure 40 guides the platform 50 and provides support to the cables 50 via pulleys 60 at the top of surrounding structure 40 that engage the cables 50. As shown, the surrounding structure 40 may include one or more guide towers 130 that may guide the platform 20 during ascent.

As shown in FIGS. 1a and 1b, the cables 50 may be connected to the platform 20, may run up the inner walls of the shaft 137, and may engage an arrangement of pulleys 60 at the top of the support structure 40. The cables 50 may further continue down to a further arrangement of pulleys 110 comprising a block-and-tackle 100. The counterweights 70 may be suspended from the further arrangement of pulleys 110.

The pulleys 60 may be arranged such that the falling counterweights 70 accelerate the platform 20 at a higher acceleration than that of the counterweights 70. In an embodiment, a block-and-tackle 100 may connect the cables 50 to the counterweights 70. A block-and-tackle 100 may be provided as a subsystem of two or more blocks 110 with the cable 50 threaded between them. In an embodiment, each block 110 may include a set of pulleys 60 mounted on a single axle. In an alternate embodiment, the blocks 110 are fiddle blocks. The mechanical advantage of the block-and-tackle 100 may be constructed to provide acceleration in the useful range for a rocket 30 (approximately 1 g to 5 g), and may be adjustable if future rockets 30 can tolerate more than 5 g. The counterweights 70 and pulleys 60 and the block-and-tackle 100 may be sized to provide more than the maximum acceleration a rocket 30 can tolerate, but in use the acceleration may be modulated using the braking system 90 to limit the acceleration to the appropriate amount for a given rocket 30.

As shown in FIGS. 1a and 1b, the platform 20 may be large enough to accommodate a desired rocket 30. The platform 20 may be adapted to support the weight of the rocket 30 multiplied by the expected acceleration. For example, a 320,000 kg rocket that will be accelerated at 5 g must have a platform capable of supporting 1.6 million kilograms.

The surrounding structure 40 may be embodied as two or more guide towers 130. In a pre-launch configuration, the guide towers 130 may extend vertically from and surround the platform 20 to define an interior shaft 137. The shaft 137 may permit the platform 20 to move freely vertically while constraining the horizontal movement of the platform 20.

Figure 3:
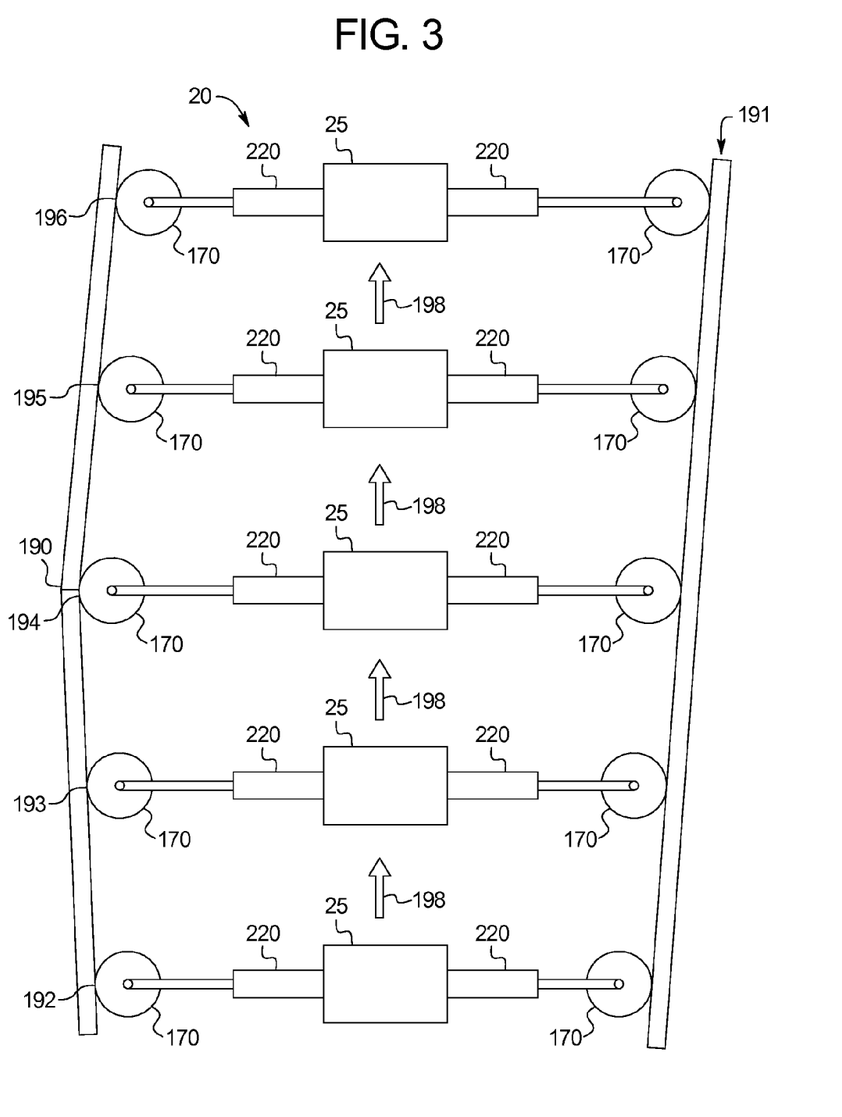
FIG. 3 illustrates the corrective action of the active positioning subsystem in positioning the platform along a straight vertical path.

It is contemplated that factors such as manufacturing defects, mechanical stress, temperature, wind, and other factors may create imperfections in the guide towers 130 causing deviations of the guide towers 130 from the straight-line vertical needed for a straight-line trajectory for the rocket 30. In an embodiment, the platform 20 may be adapted to move laterally within the shaft 137 to correct any deviations from the straight-line upward trajectory by pushing against an inner wall 135 of one of the guide towers 130. In another embodiment, a movable base plate 140 may be provided to correct deviations from the straight vertical path 198 (FIG. 3).

The rocket launch tower 10 may include stability mechanisms 80, 85 for stabilizing the rocket 30 to prevent loss of the rocket 30 due to instability during launch. Stability mechanisms 80, 85 may include passive stability mechanisms 80 and active stability mechanisms 85 that operate as part of an active positioning subsystem 200. The stability mechanisms 80, 85 may include mechanisms to locate the platform 20 horizontally within the surrounding structure 40.

Figure 2A:
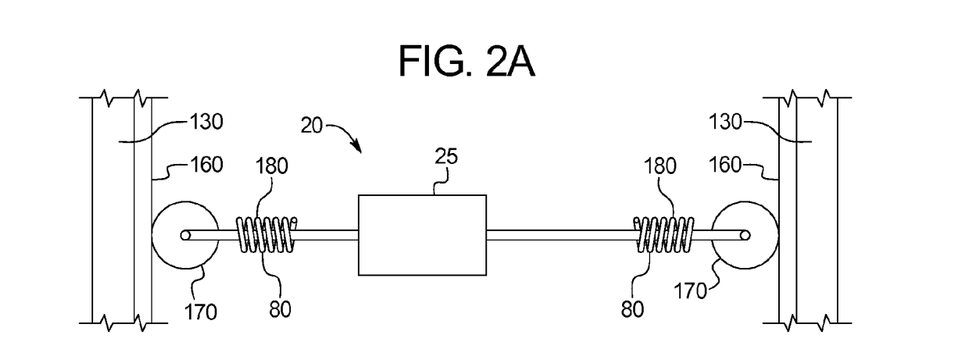
FIG. 2a illustrates a cross-sectional view of the rocket launch platform showing a platform including springs as passive stability mechanisms.

FIG. 2a illustrates examples of passive stability mechanisms 80. As shown in FIG. 2a, the inner wall 135 of the guide towers 130 may include guide rails 160. The platform 20 may include guide wheels 170 that engage with the guide rails 160 to stabilize the platform 20 during launch. The guide wheels 170 may be connected to the platform body 25 by springs 180 to dampen deviations of the platform body 25 caused by the motion of the guide wheels 170 and imperfections in the guide towers 130.

Figure 2B:
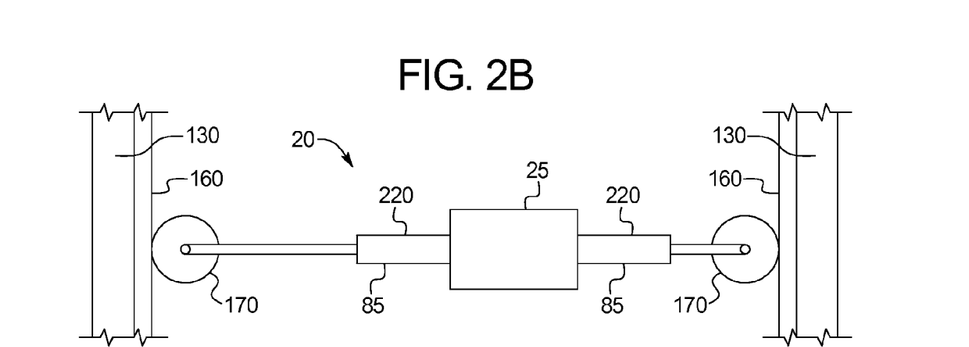
FIG. 2b illustrates a cross-sectional view of the rocket launch platform showing a platform including linear actuators as active stability mechanisms.

Turning to FIG. 2b, the rocket launch tower 10 may further include active stability mechanisms 85 that control the lateral location of the platform 20. As shown, the platform 20 may include platform linear actuators 220 that may actuate to stabilize the platform body 25 along the straight vertical path 198. The platform linear actuators 220 may be controlled by the controller 260 and may be actuated in response to imperfections 190, 191 (FIG. 3) measured by one or more sensors 210.

Figure 2C:
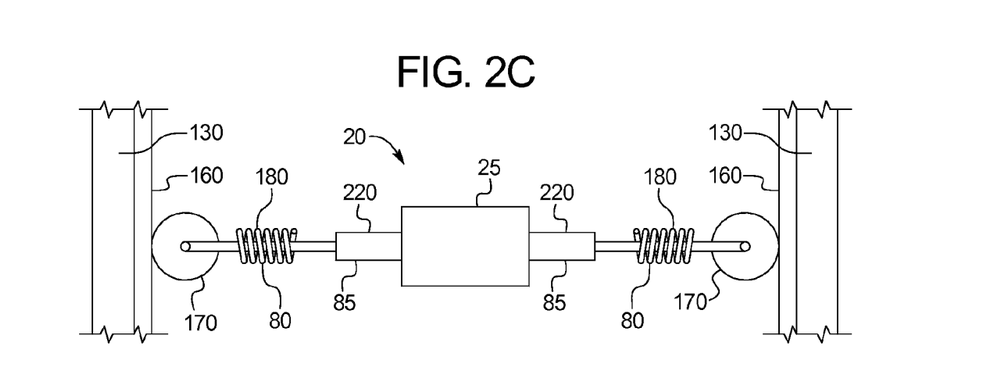
FIG. 2c illustrates a cross-sectional view of the rocket launch platform showing a platform including springs as passive stability mechanisms and linear actuators as active stability mechanisms.

In some embodiments, the platform 20 includes a combination of passive stability mechanism 80 and active stability mechanisms 85 attached to a platform body 25 for supporting the rocket 30 that comprises the bulk of the platform 20. As shown in FIG. 2c, in some embodiments, a platform 20 may include both platform linear actuators 220 and springs 180.

Turning to FIG. 3, an illustration of the action of the active positioning subsystem 200 is shown. Specifically, FIG. 3 illustrates the platform 20 at various discrete points 192, 193, 194, 195, 196 at various timesteps during a launch. As shown, the guide rails 160 of the guide towers 130 may have various imperfections 190, 191 (exaggerated here for illustrative purposes) that may cause deviation of the platform 20 from a straight vertical path 198 as the platform 20 moves along the guide rails. The imperfections 190, 191 shown include local bending of the guide rails 160 and a slight leaning of one of the guide rail 160. As the platform 20 moves along the guide towers 130 during launch, the active positioning system 200 actuates the platform linear actuators 220 to keep the platform 20 centered along the straight vertical path 198.

In some embodiments, the rocket launch tower 10 may include functionality to permit the platform 20 to be used evaluate the straightness of the surrounding structure 40. Before launch, the platform 20 may travel up the path of the platform and analyze the surrounding structure 40 to measure imperfections 190, 191 in the surrounding structure 40, as may be present in the guide towers 130, the guide rails 160, etc. In order to measure imperfections 190, 191, the platform 20 may include various sensors 210 to measure the imperfections 190, 191. For example, in an embodiment, the platform 20 may measure at various discrete points 192, 193, 194, 195, 196 the needed amount of actuation required by the platform linear actuators 220 to maintain the platform 20 along the straight vertical path 198. The measured imperfections 190, 191 are recorded by the active positioning subsystem 200. During launch, the active positioning subsystem 200 corrects for the imperfections 190, 191 dynamically as the platform 20 moves up the surrounding structure 40. In other embodiments, an additional mechanism or system may be provided in addition to the platform 20 to perform the evaluation of the straightness of the surrounding structure 40.

Figure 4A:
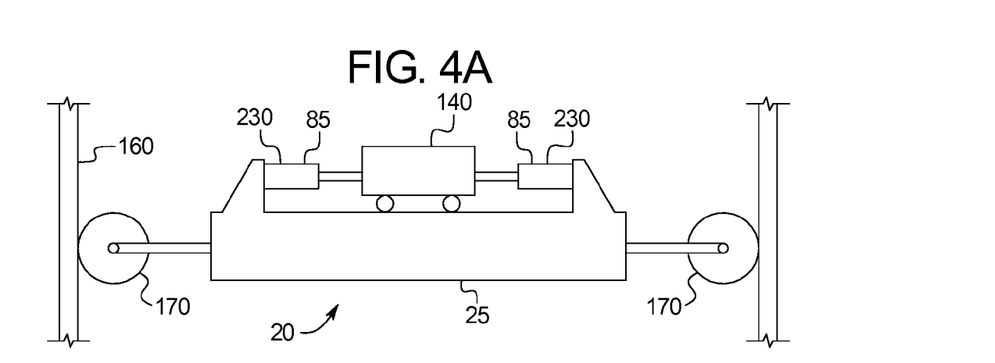
FIG. 4a illustrates an embodiment of the platform of the rocket launch tower including an attached base plate including linear actuators as active stability mechanisms for the base plate.
Figure 4B:
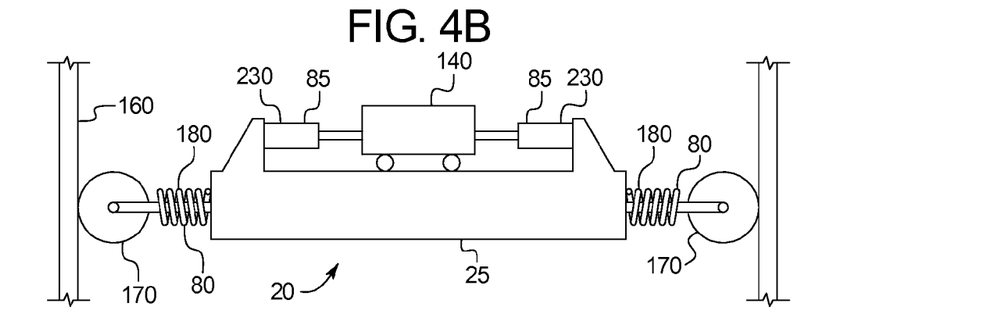
FIG. 4b illustrates an embodiment of the platform including an attached base plate including springs as passive stability mechanisms for the platform and linear actuators as active stability mechanisms for the base plate.
Figure 4C:
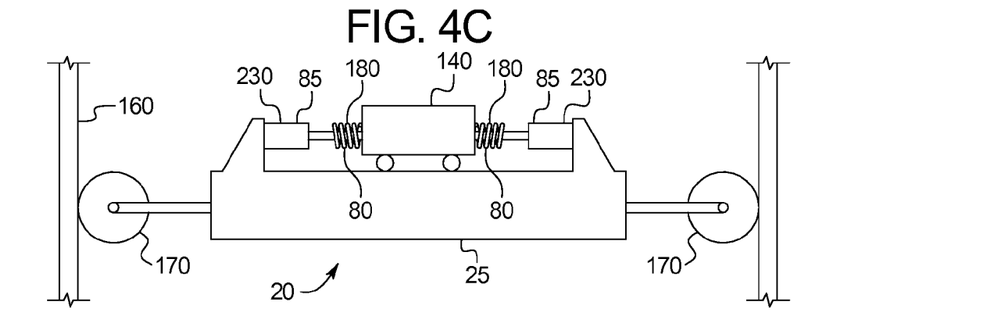
FIG. 4c illustrates an embodiment of the platform including an attached base plate including springs as passive stability mechanisms and linear actuators as active stability mechanisms for the base plate.
Figure 4D:
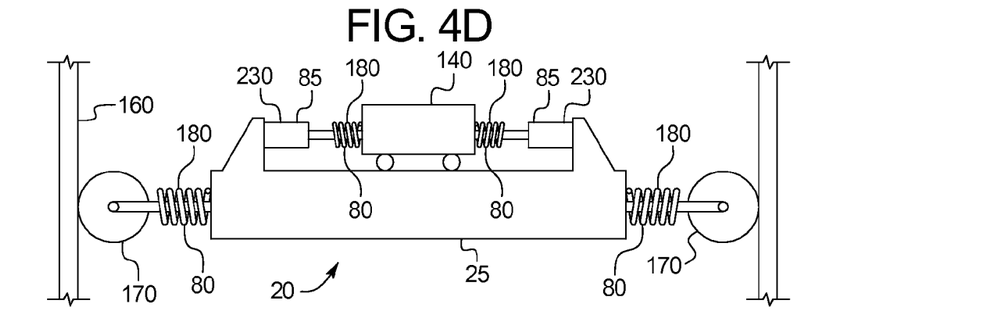
FIG. 4d illustrates an embodiment of the platform including an attached base plate including springs as passive stability mechanisms and linear actuators as active stability mechanisms for the base plate, and including springs as passive stability mechanisms for the platform.

Turning to FIGS. 4a-4d, another embodiment of the platform 20 is shown. In the embodiment, the platform 20 includes an attached base plate 140 for supporting the rocket 30 that may be passively or actively positioned relative to the platform body 25. By providing a base plate 140, the stability mechanisms 80, 85 need not operate on the entire platform 20, but may specifically fine-tune the positioning of the rocket 30. Nevertheless, as shown in FIGS. 4b and 4d, the platform 20 may be passively positioned against the inner walls 135 of the surrounding structure 40 to provide additional stability.

For example, as shown in FIG. 4a, base plate linear actuators 230 controlled by the controller 260 may stabilize the base plate 140. In another embodiment shown in FIG. 4b, the platform body 25 may be stabilized by a passive stability mechanism 80. In the example shown, the platform body 25 is stabilized by springs 180. The base plate 140, however, may be stabilized by an active stability mechanism 85. In the example shown, the base plate is connected to the platform body 25 by base plate linear actuators 230.

In some embodiments, both passive stability mechanisms 80 and active stability mechanisms 85 may be used in series. For example, as shown in FIG. 4c, the base plate 140 is connected to the platform body 25 via springs 180 that are in turn connected to base plate linear actuators 230. Similarly, in FIG. 4d, the platform body 25 itself is connected to the guide wheels 170 by springs 180, in addition to the springs 180 connecting the base plate 140 to the base plate linear actuators 230 and, in turn, connecting the base plate 140 to the platform body 25.

In another embodiment, the stability mechanisms 80, 85 may include mechanisms to locate the base plate 140 horizontally relative to the platform body 25 on which the base plate 140 is supported. In embodiments with a base plate 140, the stability mechanisms 80, 85 may include hydraulic rams, linear actuators, levers, gear-driven mechanisms, etc. The stability mechanisms 80, 85 may also include passive mechanisms, which may be comprised of springs, torsion bars, or other such passive suspension elements.

Figure 5:
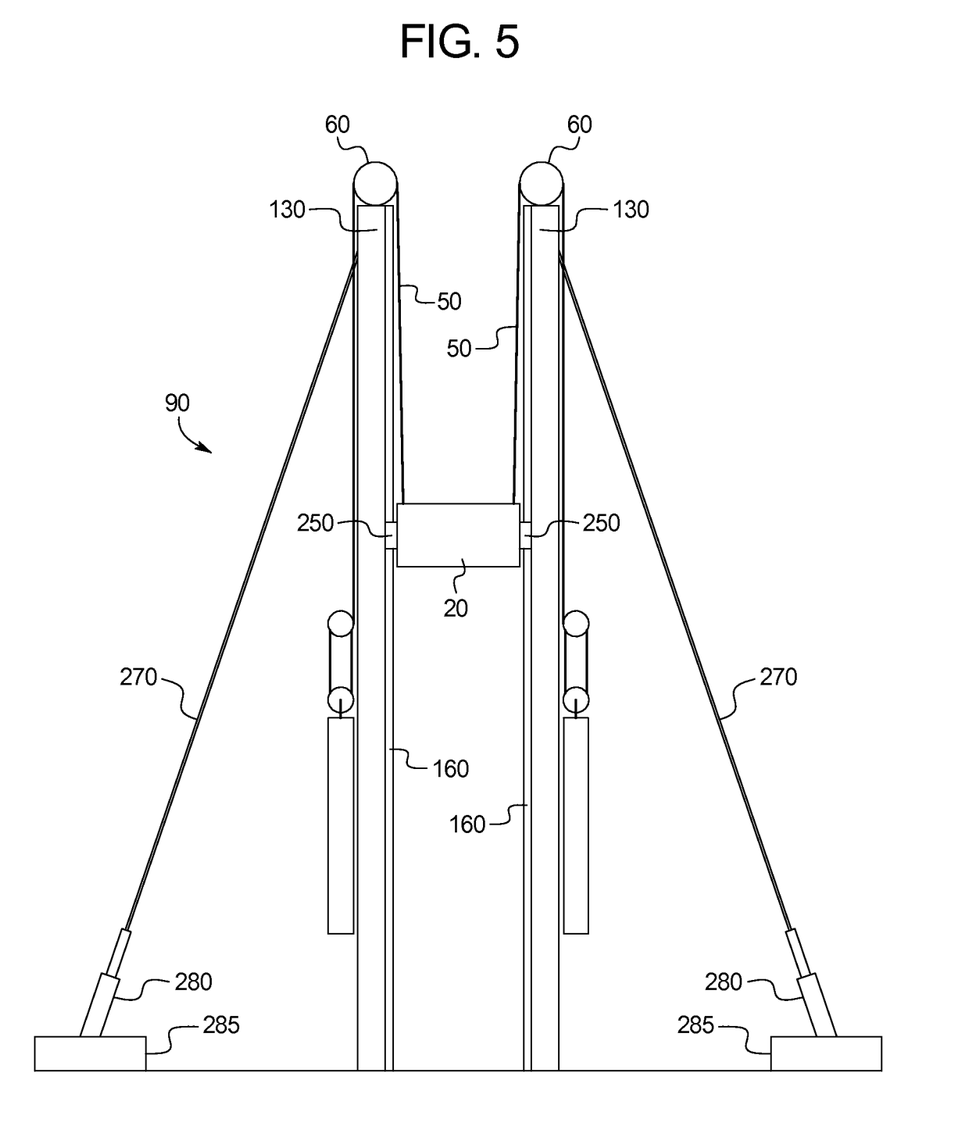
FIG. 5 illustrates an embodiment of the rocket launch tower including adjustable support wires and brakes.

In an embodiment, the active stability mechanisms 85 may include a braking system 90, as shown in FIG. 5. The braking system 90 serves to control the vertical speed of the platform 20 and stop the platform 20 after the rocket 30 has left the platform 20. The braking system 90 may include traditional brake calipers 250 attached to the platform 20 to brake the platform 20 by applying friction to the guide rails 160 or other, separate and parallel, braking rails. In other embodiments, the braking system 90 may be comprised of a braking calipers 250 attached to the pulleys 60, blocks 110, or to the cables 50.

Additionally, in an embodiment, the rocket launch tower 10 may include an acceleration control system to limit the acceleration applied to the rocket 30 to levels appropriate for the rocket 30 and its payload. The acceleration control system may include the braking system 90, the controller 260, and sensors 210 to measure the vertical acceleration of the platform 20. During launch, the controller 260 compares the platform position data received from the sensors 210 to an intended platform acceleration and in response to receipt of platform position data indicating the platform acceleration has deviated from the intended platform acceleration, the controller 260 causes the acceleration control system to actively correct the platform acceleration towards the intended platform acceleration.

As further shown in the embodiment of FIG. 5, there may be an arrangement of adjustable support wires 270 connected between the surrounding structure 40 and the ground or other fixed object. The support wires 270 may serve to keep the surrounding structure 40 straight by applying tension to compensate for any bending or lack of straightness in the guide towers 130. The support wires 270 may be connected to adjustable support wire motors 280 to permit real-time adjustment. The motors 280 may be firmly held to the ground by weight blocks 285 or other supports necessary to hold the support wires 270 firm. The support wire motors 280 may be controlled by the controller 260 to compensate for any lack of straightness in the towers including shifting and bending of the towers due to wind, thermal expansion, and other effects. The support wire motors 280 may be linear actuators, electric motors, etc. Each support wire motor 280 may be attached to a weighted block or structure embedded in or attached to the ground.

Adjustment using the support wires 270 may proceed as follows: the controller 260 detects any lack of straightness in the rocket launch tower 10 using the sensors 210. For example, imagine that the rocket launch tower 10 is found to be leaning to the left (e.g., the top of the rocket launch tower 10 is too far to the left from the perspective of a viewer in front of the rocket launch tower 10). In this case, the right support wire motors 280 would be adjusted to increase the tension on the right support wire 270, and the left support wire motors 280 connected to the left support wire 270 would be adjusted to decrease the tension on the left support wire 270, thereby pulling the tower back into a vertical position. Although the rocket launch tower 10 is shown as having two support wires 270, in other embodiments, the rocket launch tower 10 may include any number of support wires 270 at varying positions around the rocket launch tower 10, and at varying heights up and down the rocket launch tower 10, as will be understood by one of ordinary skill in the art from the examples provided herein.

Figure 6:
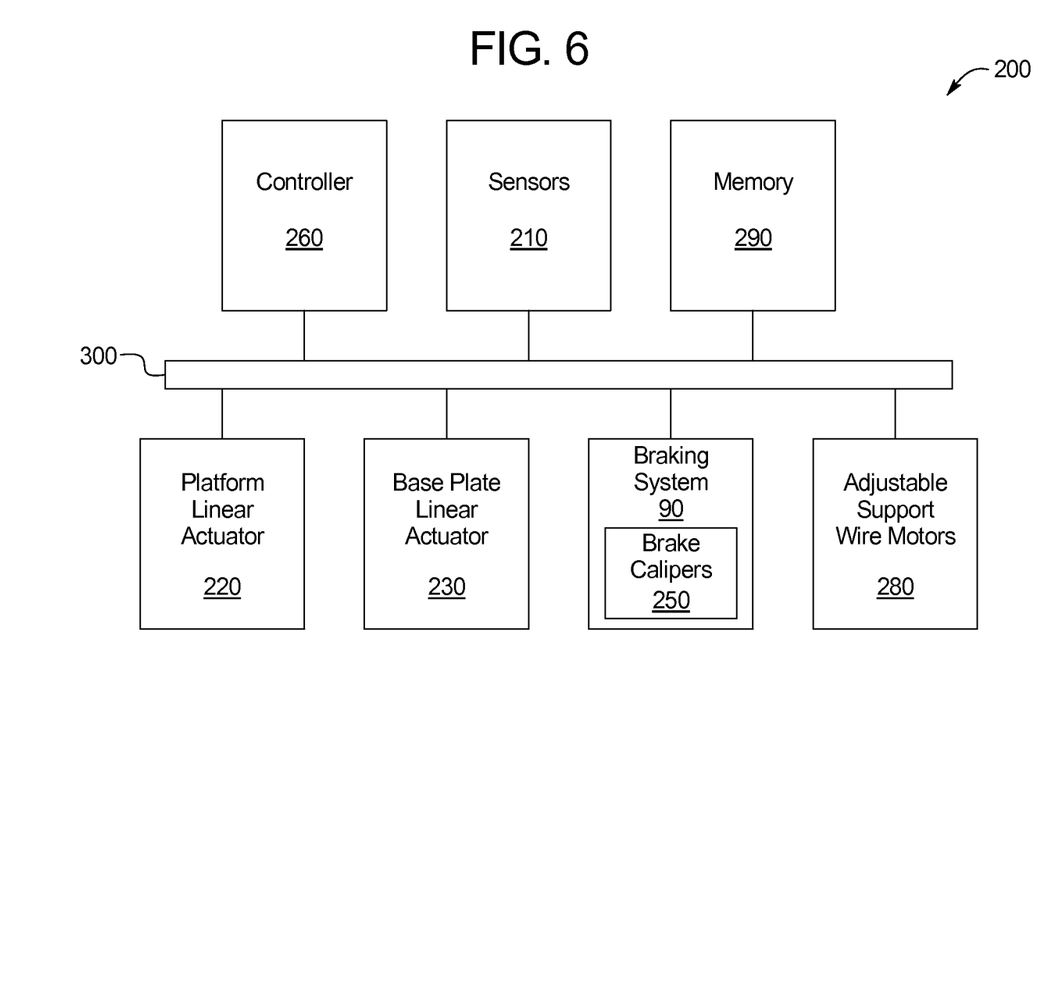
FIG. 6 is a schematic diagram illustrating the active positioning system of the rocket launch tower.

As shown in FIG. 6, the rocket launch tower 10 may include an active positioning system 200 for managing the rocket launch tower 10 to stabilize the rocket 30 during ascent. As shown, the active positioning system may include: the controller 260, one or more sensors 210, a main memory 290 including instructions for stabilizing the rocket 30, and one or more active stability mechanisms 85, such as: platform linear actuators 220, base plate linear actuators 230, the braking system 90, and adjustable support wire motors 280. The sensors 210 may include sensors 210 that measure: the vertical acceleration of the platform 20, the vertical speed of the platform 20, the vertical position of the platform 20, the horizontal acceleration of the platform 20, the horizontal speed of the platform 20, the horizontal position of the platform 20, the tilt of the platform 20, the horizontal acceleration of the base plate 140, the horizontal speed of the base plate 140, the horizontal position of the base plate 140, the tilt of the base plate 140, the acceleration of the cables 50, the speed of the cables 50, the rotational acceleration of the pulleys 60, the rotational speed of the pulleys 60, etc.

The active positioning subsystem 200 may be programmed to attempt to maintain certain movement of the platform 20. Typically this will involve a certain rate of acceleration depending on the capability of the rocket 30 as well as maintaining ascent of the rocket 30 on the straight vertical path 198. The active positioning subsystem 200 may manage the rate of acceleration by modulating the braking system 90 (for example, if the platform 20 exceeds the requested acceleration it will apply braking, if the platform 20 fails to reach the required acceleration it will reduce braking). Additionally, if the sensor 210 and active positioning subsystem 200 detects that the platform 20 is beginning to tilt (for example, one side of the platform 20 is moving upward more quickly than the other), the active positioning subsystem 200 may apply additional braking on the too-high side, while reducing braking on the too-low side. Finally, the active positioning subsystem 200 may adjust the active stability mechanisms 85 of the active positioning system 200 when it detects a lateral movement of the platform 20 such that the platform 20 or the base plate 140 moves away from the straight vertical path 198.

As described, a controller 260 controls aspects of the rocket launch tower 10 described herein. The controller 260 may be embodied in one or more controllers 260 that may be adapted run a variety of application programs, access and store data, including accessing and storing data in associated database (which may be embodied in one or more databases), and enable one or more interactions with the other components of the rocket launch tower 10. Typically, the one or more controllers 260 are embodied in one or more programmable data processing devices. The hardware elements, operating systems, and programming languages of such devices are conventional in nature, and it is presumed that those skilled in the art are adequately familiar therewith.

For example, the one or more controllers 260 may be a PC based implementation of a central control processing system utilizing a central processing unit (CPU), memories 290 and an interconnect bus 300. The CPU may contain a single microprocessor, or it may contain a plurality of microprocessors for configuring the CPU as a multi-processor system. The memories 290 include a main memory 290, such as a dynamic random access memory 290 (DRAM) and cache, as well as a read only memory 290, such as a PROM, EPROM, FLASH-EPROM, or the like. The system may also include any form of volatile or non-volatile memory 290. In operation, the main memory 290 stores at least portions of instructions for execution by the CPU and data for processing in accord with the executed instructions.

The one or more controllers 260 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 260 may further include appropriate input/output ports for interconnection with one or more output displays and one or more input mechanisms serving as one or more user interfaces for the controller 260. For example, the one or more controllers 260 may include a graphics subsystem to drive digital displays. The links of the peripherals to the system may be wired connections or use wireless communications.

Although summarized above as a PC-type implementation, those skilled in the art will recognize that the one or more controllers 260 also encompasses systems such as host computers, servers, workstations, network terminals, and the like. In fact, the use of the term controller 260 is intended to represent a broad category of components that are well known in the art.

Aspects of the systems and methods provided herein encompass hardware and software for controlling the relevant functions. Software may take the form of code or executable instructions for causing a controller 260 or other programmable equipment to perform the relevant steps, where the code or instructions are carried by or otherwise embodied in a medium readable by the controller 260 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory 290 of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A rocket launch tower comprising:
a vertical support structure including two or more guide towers defining a vertical shaft between the two or more guide towers, each guide tower including one or more pulleys engaging one or more cables;
a platform located within the vertical shaft and connected to the one or more cables;
a drive mechanism that applies a force to the one or more cables to accelerate the platform along a trajectory within the vertical shaft;
one or more sensors collecting data regarding the position of the platform along the trajectory within the vertical shaft and communicating the platform position data to a controller, the controller in communication with an acceleration control system including one or more brakes acting on the platform;
wherein, the controller compares the platform position data received from the sensors to an intended platform acceleration and in response to receipt of platform position data indicating the platform acceleration has deviated from the intended platform acceleration, the controller causes the acceleration control system to actively correct the platform acceleration towards the intended platform acceleration;
wherein the controller is also in communication with an active positioning system including the one or more brakes, further wherein, in response to receipt of platform position data indicating a platform trajectory has deviated from the intended platform trajectory, the controller causes the active positioning system to actively correct the platform trajectory towards the intended platform trajectory; and
wherein each guide tower includes one or more guide rails, the platform includes two or more guide wheels, each of the guide wheels engages one of the one or more guide rails, and the active positioning system includes one or more linear actuators connecting the platform to the guide wheels.

2. The rocket launch tower of claim 1, wherein the drive mechanism includes one or more counterweights connected to the one or more cables by a block-and-tackle.

3. The rocket launch tower of claim 1, wherein the active positioning system further includes one or more linear actuators.

4. The system of claim 1, further including a base plate, wherein the base plate includes one or more wheels, and the one or more wheels engage the platform.

5. The system of claim 4, wherein the base plate is connected to the platform by one or more linear actuators.

6. The system of claim 5, wherein a spring connects the linear actuator to the platform.

7. The system of claim 1, wherein each guide tower includes one or more guide rails, the platform includes two or more guide wheels, each guide wheels engages one of the guide rails, each guide wheel is connected to the platform by a linear actuator, each linear actuator includes a sensor to measure the amount of actuation, wherein the controller is adapted to:
- receive from each sensor, during a pre-launch test, a plurality of measurements, taken at a plurality of points along the shaft, of the amount of actuation sufficient to maintain the platform trajectory along a straight vertical path;
- direct each actuator, during a launch, to actuate at each point along the shaft in accordance with the amount of actuation sufficient to maintain the platform trajectory along a straight vertical path.

8. The rocket launch tower of claim 1, wherein each guide tower includes one or more guide rails along the vertical shaft, the platform includes two or more guide wheels, and each guide wheels engages one of the one or more guide rails.

9. The rocket launch tower of claim 8, wherein each guide wheel is connected to the platform by a spring.

10. The rocket launch tower of claim 1, further including a base plate, wherein the base plate includes one or more wheels, each wheel engages the platform, and the base plate is laterally connected to the platform by one or more springs.

11. The rocket launch tower of claim 1, wherein each guide tower includes one or more guide rails along the shaft, the platform includes two or more guide wheels, the two or more guide wheels engage the one or more guide rails, the platform includes a base plate, and the base plate includes one or more wheels that engage the platform.

12. The system of claim 1, wherein the one or more brakes are connected to one of the vertical support structure or the platform, and the brakes, when activated by the controller, apply a braking force to one of: the one our more counterweights, the one or more cables, the one or more pulleys, and the platform.

13. The system of claim 1, wherein the one or more sensors include a straightness sensor attached to each guide tower detecting deviations of the guide tower from vertical straightness, the active positioning system further includes one or more support wires connected to the support structure, each of the support wires is connected to one or more tightening motors controlled by the controller, wherein the controller causes the one or more tightening motors to adjust the tension of the one or more support wires when the controller detects a deviation of one of the guide towers from vertical straightness.

* * * * *